A. J. HORTON.
BATTERY CHARGING APPARATUS.
APPLICATION FILED FEB. 25, 1918.
1,433,455.
Patented Oct. 24, 1922.
3 SHEETS—SHEET 1.
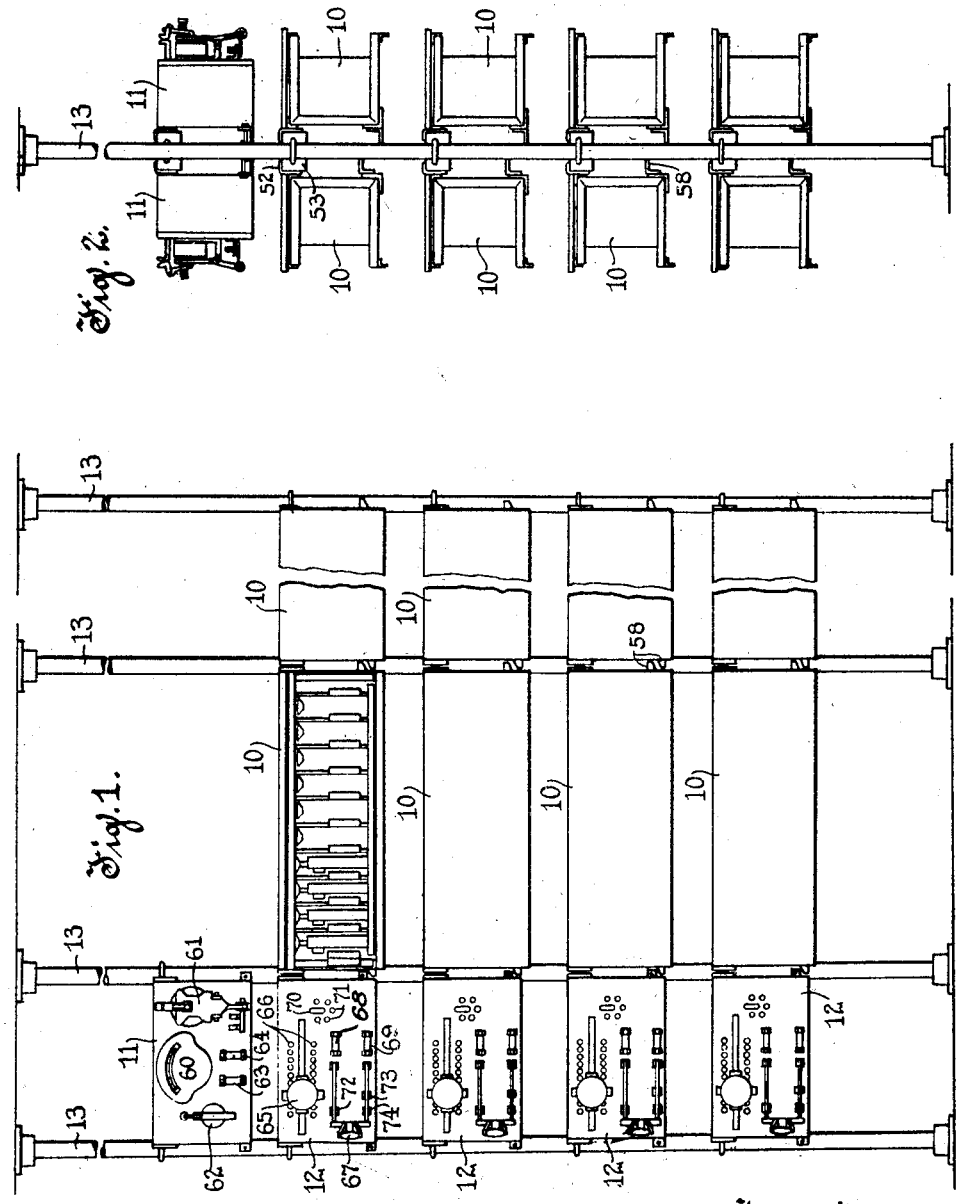

A. J. HORTON.
BATTERY CHARGING APPARATUS.
APPLICATION FILED FEB. 25, 1918.
1,433,455.
Patented Oct. 24, 1922.
3 SHEETS—SHEET 2.
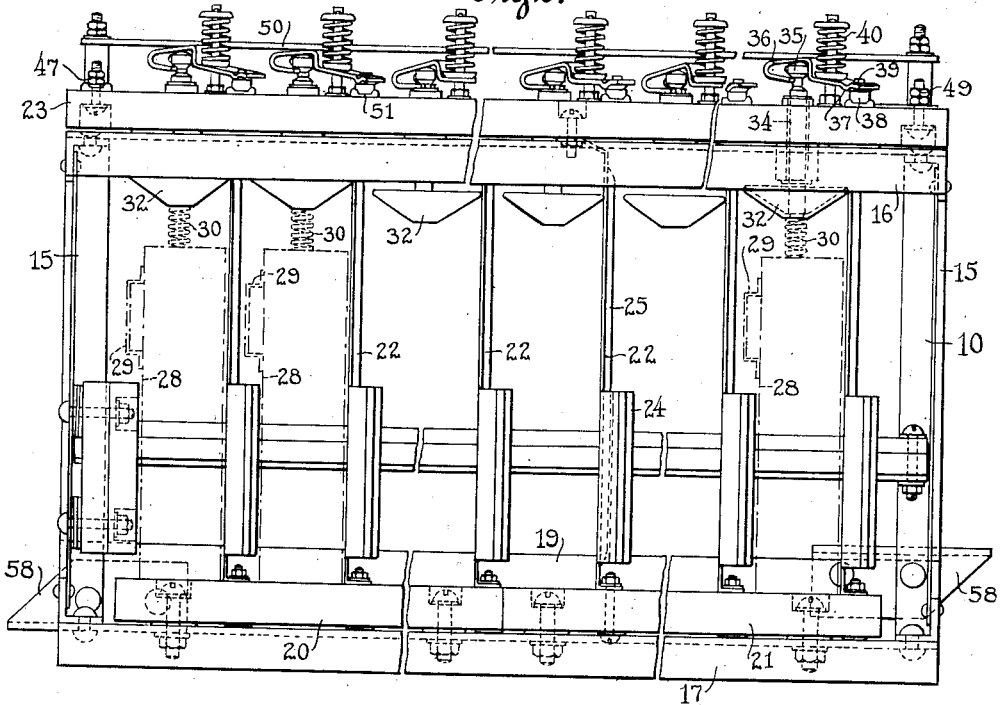
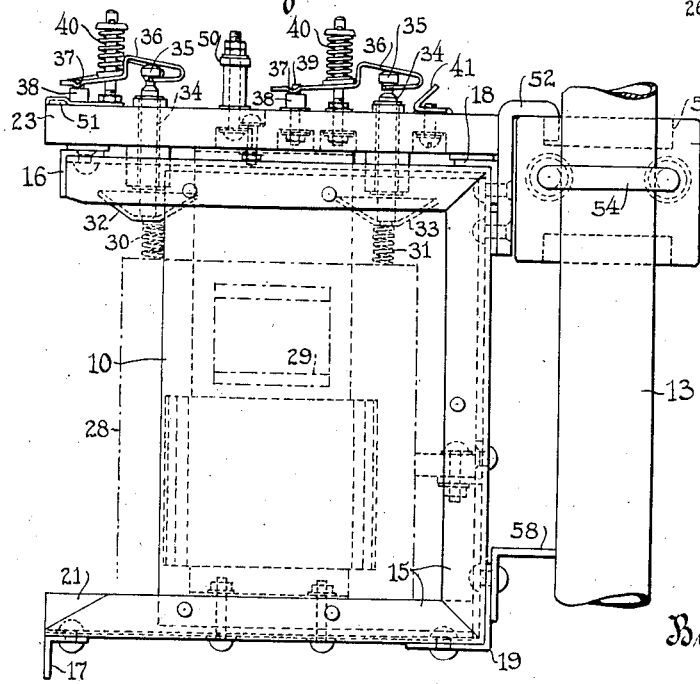
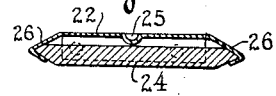
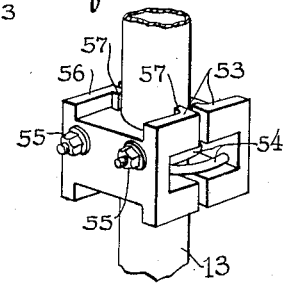
Inventor
Albert J. Horton
By Frank H. Hubbard
Attorney

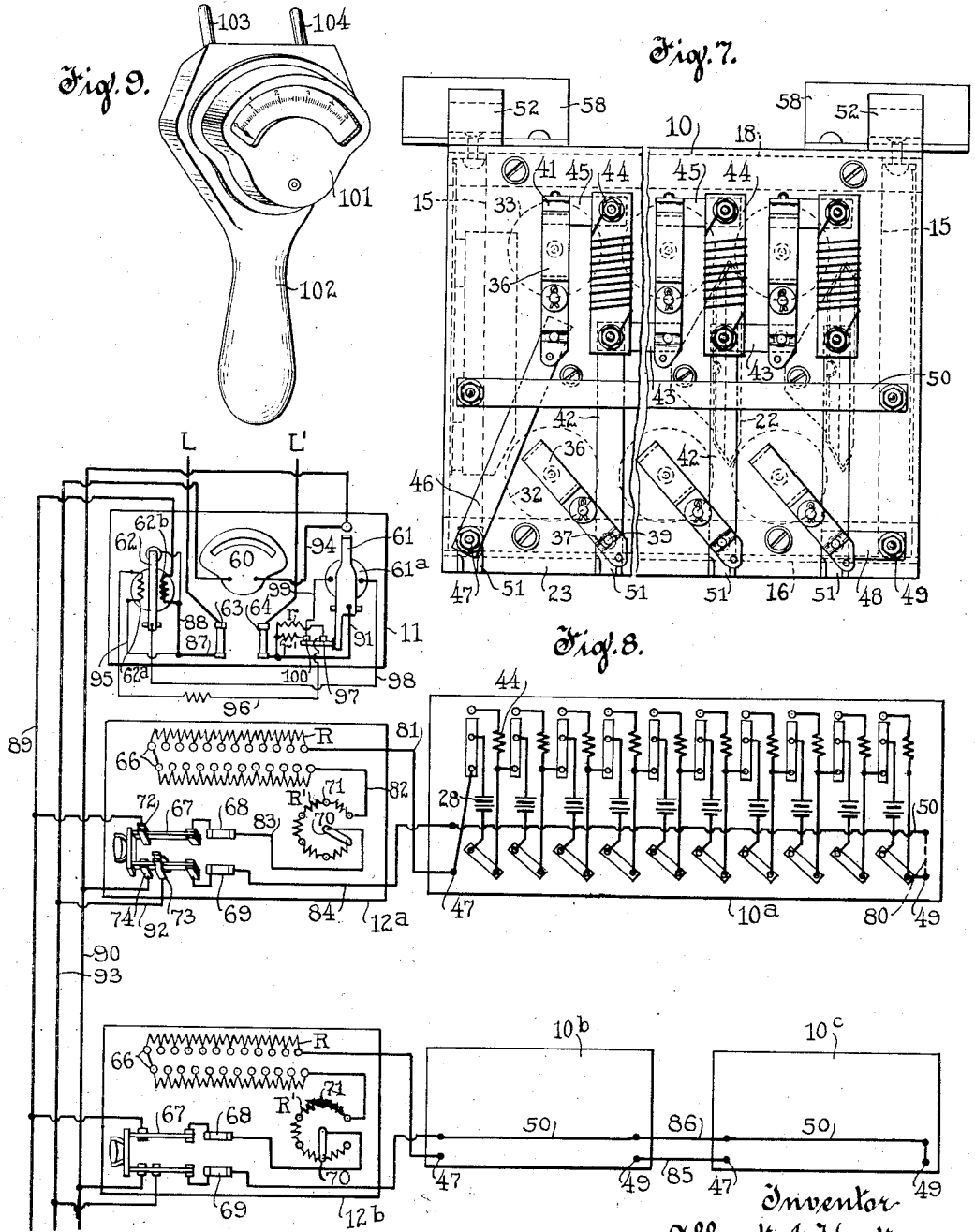

Patented Oct. 24, 1922.

1,433,455

UNITED STATES PATENT OFFICE.

ALBERT J. HORTON, OF WHITE PLAINS, NEW YORK, ASSIGNOR TO THE CUTLER-HAMMER MFG. CO., OF MILWAUKEE, WISCONSIN, A CORPORATION OF WISCONSIN.

BATTERY-CHARGING APPARATUS.

Application filed February 25, 1918. Serial No. 218,933.

*To all whom it may concern:*

Be it known that I, ALBERT J. HORTON, a citizen of the United States, residing at White Plains, in the county of Westchester and State of New York, have invented new and useful Improvements in Battery-Charging Apparatus, of which the following is a full, clear, concise, and exact description, reference being had to the accompanying drawing, forming a part of this specification.

This invention relates to improvements in battery charging apparatus and particularly to charging apparatus for miners' lamp batteries.

The storage battery type of miners' lamp is being rapidly adopted and the careful preservation and charging of the required number of batteries has become quite a serious problem to the user. The batteries of such lamps are relatively expensive and must be charged daily which has led to the use of so-called charging racks in which the batteries are placed for both safe keeping and charging immediately upon being turned in by the miners. But such racks have heretofore been rather crude and have required special construction for a given number of batteries whereas the number of lamps used in different mines vary widely and mines requiring only a small number of lamps at the start may ultimately require a materially larger number.

The present invention has among its objects to provide a sectional charging rack for such lamp batteries comprising rugged and durable units which may be readily increased in number as the demand for rack space increases and which may be assembled in various different ways to adapt the same to the space and position available therefor.

A further object is to provide a readily installable rack unit adapted to house a plurality of batteries, and preferably such a number of batteries that a given number of full racks may be connected to the charging circuit in series through a common rheostat panel.

A further object is to provide in conjunction with such a charging rack sectional control apparatus to be mounted upon the supporting frame of said rack, such control apparatus including a rheostat unit for each step of a given number of rack units and a meter panel common to a plurality of such sets of rack units.

A further object is to provide rheostat units which may be quickly and easily adjusted to control a varying number of rack units.

A further object is to provide a rack unit having contacts in each battery compartment for engagement with the terminals of the enclosed battery and having all other current carrying parts external to said compartments.

A further object is to provide a rack unit which will vary the resistance of the circuit in which it is included according to the number of batteries placed therein to thereby compensate for variations in the number of batteries included in said circuit without requiring resistance adjustment on the respective rheostat panels.

A further object is to provide a rack unit enabling expeditious voltage readings of the batteries placed therein.

A further object is to provide a sectional charging rack which will greatly facilitate and expedite the handling of batteries by the attendant in charge thereof, it being the usual practice to number each lamp and battery correspondingly, charging both to one user and to place the battery in a correspondingly numbered compartment of the charging rack while placing the lamp on a separate rack.

Various other objects and advantages will hereinafter appear.

One embodiment of the invention is illustrated in the accompanying drawings which will now be described, it being understood that the invention is susceptible of various modifications without departing from the scope of the appended claims.

In the accompanying drawings,

Figure 1 is a front elevation of a rack with its control and meter panels;

Fig. 2 is a side elevation of Fig. 1;

Fig. 3 is a front elevation on an enlarged scale of one of the rack units shown in Fig. 1;

Fig. 4 is an end elevation of Fig. 3;

Figs. 5 and 6 are enlarged detail views of parts of Figs. 3 and 4.

Fig. 7 is a top plan view of Fig. 3;

Fig. 8 is a diagrammatic view showing one circuit arrangement for the rack shown in Fig. 1; and, Fig. 9 is a perspective view of one form of voltmeter adapted to be used in conjunction with the rack.

Referring to Figs. 1 and 2, the rack shown comprises a plurality of rack units 10, a common meter panel 11 and a plurality of rheostat panels 12, said units being mounted upon a row of pipe supports 13. As shown, there are four horizontal rows of rack units on opposite sides of the pipe supports each horizontal row being provided with a separate rheostat panel and the rack units on each side of the supports being provided with a common meter panel. It is to be understood, however, that the number of horizontal rows might be varied and that the number of rack units in each row might be varied as desired within a given maximum according to the line voltage and the battery capacity of each rack unit. Also, as shown, each rack unit is constructed to house ten batteries, but it is to be understood that the units might be constructed to house a greater or less number of batteries. Where units of the battery capacity shown are employed it is usually possible to place five of the same in series with one rheostat panel and such is the preferred arrangement wherever possible. With this arrangement it is possible to place fifty batteries in a horizontal row on one side of the frame and to number the battery compartments in vertical and horizontal rows whereby when the batteries are handled on the checking system the proper compartment for any given battery may be very readily located.

Each rack unit, as shown in Figs. 3 to 7, comprises a skeleton steel frame including angle bar end members 15 of U-shape, front angle bar connecting members 16 and 17 and rear angle bar connecting members 18 and 19, the members 16 and 18 being located at the top of the frame and the members 17 and 19 at the bottom of the frame. Supported by and fixed to the bottom cross members are insulating blocks 20 and 21 of suitable material and to these blocks are fixed equally spaced and vertically disposed partitions 22 of sheet metal, said partitions also being fixed to an insulating slab 23 mounted upon and fixed to the top cross members 16 and 18. The adjacent partitions 22 are so spaced as to receive a single battery therebetween and each partition carries an insulating block 24 (Fig. 5) to hold the battery to the right thereof out of contact therewith. As shown, in Fig. 5, each partition is corrugated to provide a vertically extending rib 25 and is provided with folded back edges 26 to clamp and support its insulating block 24. Thus the batteries are supported upon the insulating blocks 20 and 21 and are held in spaced relation by other insulating blocks 24 which are so arranged as to necessitate the batteries being inserted in a given manner. As shown in Fig. 3, the batteries 28, which are of usual form are provided on one side with projecting strap clips 29 and the blocks 24 serve to obstruct insertion of the batteries unless said clips are vertically aligned with said blocks. Also, each battery is provided with upwardly extending terminals 30 and 31 shown as comprising coil springs, said terminals being arranged adjacent to opposite edges of the battery. Accordingly since all batteries must be inserted in a like manner their terminals of like polarity will be transversely aligned and will be insured engagement with the proper stationary contacts of the rack unit.

Each compartment of the rack unit (Fig. 4) is provided with a pair of mushroom shaped contacts 32 and 33, the contacts 32 being arranged in transverse alignment at the front of the rack unit and the contacts 33 in transverse alignment at the rear of the rack unit. Each of these contacts is carried by a stem 34 extending upwardly through the slab 23 and provided with a head 35 engaged by a supporting lever 36. Each lever has a transverse bearing rib 37 resting upon a bearing block 38 which is provided with a pin 39 projecting through the lever to anchor the same against lateral displacement. And each lever has a coil spring pressure device 40 biasing the same to depress its mushroom shaped contact. Thus the contacts 32 and 33 are yieldable to permit insertion of the batteries while their pressure devices serve to insure firm engagement thereof with the battery terminals. Also, the mushroom shape of said contacts facilitates the lifting of the contacts to permit insertion of the batteries and provides a large contacting surface, while the mounting of said contacts provides for rotation thereof and consequent change of the portions engaged by the battery terminals. Current is supplied to the contacts through the levers 36, as will hereinafter appear, and the levers 36 connected with the rear contacts also serve as movable contact members to co-operate with contacts 41 fixed to the slab 23. The rear levers 36 and their co-operating contacts 41 are utilized as hereinafter set forth, to control resistance shunts for the several batteries and the arrangement is such that said levers and contacts are normally engaged and are disengageable by the lift of their corresponding contacts 33 incident to the insertion of a battery therebeneath.

Each rack unit as shown in Fig. 7 has mounted on the upper face of its insulating slab 23 a plurality of sets of conducting strips 42—43 serving to electrically connect the front contact 32 of each battery compartment with the rear contact 33 of the adjacent battery compartment to the right thereof, whereby assuming the insertion of batteries in all compartments of the rack unit said batteries will be connected in series. Also, each rack unit has mounted on the slab 23 thereof a plurality of resistance units 44 each connected between the rear contacts 33 of adjacent battery compartments to maintain connection of such compartments when the battery contained in the compartment to the left is removed and to compensate for the resistance reduction in the rack circuit incident to removal of such battery. More specifically each resistance unit is located between the contacts 33 of adjacent compartments and connected to the contact 33 to the right thereof by one of the conducting strips 43 and to the contact 33 to the left thereof by a strip 45 which leads to contact 41. Thus in normal position of the contacts 33 their supporting levers 36 engage contacts 41 to include in circuit all of the resistance units, while insertion of a battery in any compartment lifts the contact 33 thereof thereby disengaging the supporting lever from its contact 41 and interrupting the circuit of the corresponding resistance unit or in other words, interrupting the resistance shunt around said battery. Further, each rack unit has mounted on its slab 23 a conducting strip 46 extending from a binding post 47 to the contact 33 of the extreme left hand battery compartment, a conducting strip 48 extending from contact 32 of the extreme right hand battery compartment to a binding post 49 and a busbar 50 extending from end to end of said rack unit and insulated from all other current carrying parts of the latter. The binding posts 47 and 49 are positioned at opposite ends of the rack unit adjacent to the front edge of the latter and these binding posts and the conducting strips 42 are each provided with a contact clip 51 for a purpose hereinafter set forth.

The rack units are provided with hooks 52 for engagement with brackets 53 clamped to the pipe supports, as best shown in Figs. 4 and 6. As shown in Fig. 6, each bracket comprises two blocks grooved to fit snugly about one of the pipe supports and each carrying a U-shaped clamping member 54 to firmly clamp the same to the pipe support. The two blocks are recessed to house the clamping members, each of which has its extremities projected through one of the blocks and provided with clamping nuts 55. Also, each of the blocks is recessed to provide lips 56 to be engaged by the hooks on the rack units and to further provide abutments 57 for the side edges of said hooks. Accordingly if the pipe supports be properly spaced the brackets will serve also to prevent lateral displacement of the rack units and as will be apparent these brackets are readily adjustable to vary the position of the rack unit supported thereby. The rack units are also provided at their lower ends with spacing plates 58 abutting the pipe supports to prevent tipping of said units. These angle plates, as shown in Figs. 1 and 3, extend laterally of the rack units and to avoid interference between those of adjacent rack units, their extremities are beveled to match.

The meter panel and the rheostat panels are similarly mounted on the pipe supports and are preferably clamped at their upper and lower ends to said supports. As shown, in Fig. 2, the lower clamps are of conventional form, there being no necessity for providing brackets on the pipe supports.

The meter panel 11 is provided with an ammeter 60, an electromagnetic line switch 61, a relay 62, and fuses 63 and 64, while each rheostat section is provided with a sliding cross head 65 co-operating with a double row of contact buttons 66, a knife switch 67, fuses 68, 69 and a pivoted lever 70 co-operating with a series of buttons 71. The knife switch of each rheostat unit is provided with two blades, one to engage and disengage a contact 72 and the other to selectively engage contacts 73 and 74 and to disengage both. In practice the switch is preferably constructed as schematically illustrated in Fig. 8, whereby initial closing movement engages the two blades with contacts 72 and 73 respectively, while continued closing movement maintains engagement of one blade with contact 72 and disengages the other blade from contact 73 and engages the same with contact 74.

Referring to Fig. 8, the same diagrammatically illustrates a portion of the equipment shown in Fig. 1, namely a meter panel 11, two rheostat panels which for distinction are designated as 12$^a$ and 12$^b$ and three rack units which for distinction are designated as 10$^a$, 10$^b$ and 10$^c$. The rheostat panels are supplied with current from lines L and L' through meter panel 11 and the rack unit 10$^a$ is connected to rheostat panel 12$^a$ while both rack units 10$^b$ and 10$^c$ are connected to rheostat panel 12$^b$. The rack unit 10$^a$ is drawn on an enlarged scale to enable a diagrammatic showing of its current carrying parts above described and the batteries contained in its compartments, and as will be apparent circuit may be traced from binding post 47 through the batteries in series to binding post 49 and thence through other rack units as hereinafter described, or by a connection 80 directly to bus-bar 50. Binding post 47 is connected by conductor 81 to and through a resistance R variable by the cross head 65 and buttons 66, and thence by conductor 82 to and through a resistance R' variable by the lever 70 and buttons 71, by conductor 83 to and through fuse 68 to one pole of the knife switch 73, while bus-bar 50 is connected by conductor 84 to and through fuse 69 to the opposite pole of said knife switch. Accordingly, assuming closure of the knife switch to supply current to conductors 83 and 84 the current traversing the batteries contained in the rack unit is forced to traverse the resistances R′ and R subject to regulation of said resistances by their respective control elements. The resistance R′ is divided into a plurality of steps, each step being approximately equal to the battery resistance of a full rack unit and the total number of said steps being one less than the maximum number of rack units which it is permissible to connect to the rheostat panel. Thus if it is only desired to connect a portion of the permissible maximum number of rack units to a given rheostat panel, the omitted rack units may be readily compensated for by including a step of the resistance R′ in lieu of each. For example, where only one rack unit is connected to a rheostat panel, the arm 70 should be adjusted, as on panel $12^a$, to include all of the resistance R′, whereas if two rack units are connected to a single rheostat panel, then the arm 70 should be adjusted as on panel $12^b$ to exclude one step of resistance R′. And in the latter case the rack units may be interconnected as in the case of units $10^b$ and $10^c$ regardless of the number thereof, i. e., the binding post 49 of the first rack unit may be connected as by a conductor 85 to binding post 47 of the second unit and so on, while the binding post 49 of the last unit may be connected to its respective bus-bar 50 and the bus-bars interconnected as by conductors 86. Then whether there be one or more rack units regulation of the resistance R by the cross head 65 provides for regulation at will of the current delivered to the bank of batteries. And as above set forth, the resistances 44 provided on the rack units serve to compensate for variation of the number of batteries in each rack unit.

With the main switch 61 of the meter panel closed, charging circuits may be traced from line L through fuse 63, by conductors 87 and 88 to a conductor 89 and thence to the contacts 72 of both rheostat panels, and from contacts 74 of the rheostat panels to conductor 90 and thence through main switch 61 by conductor 91 through fuse 64 to line L′. Also, with the knife switch of either rheostat panel positioned to disengage contacts 74 and to engage contacts 73, a circuit may be traced from line L to contacts 72 of said panel, as above described, thence through the rack unit or units connected thereto, to contact 73 and by conductors 92 and 93 through ammeter 60, by conductor 94 to and through main switch 61 to line L′. Thus such positioning of the knife switch of any rheostat panel enables an ammeter reading therefor while full closing movement of such switch provides for interruption of the ammeter circuit and establishment of the charging connections previously described.

The main switch 61 has an operating winding $61^a$ controlled by the relay 62 and said relay has a winding $62^a$ connected across the supply circuit and a winding $62^b$ connected in series between line L and the rheostat panels. The arrangement is such that under normal conditions the relay operates in response to its winding $62^a$ to energize the main switch and releases under abnormal conditions, i. e., when the batteries discharge back to the line, to de-energize the main switch and thus interrupt the charging circuits. More specifically the circuit of the winding $62^a$ extends from line L to conductor 87 by conductor 95 through said winding by conductor 96 through auxiliary contacts 97 of the main switch to conductor 91 and thence to line L′, assuming the main switch to be open. When the main switch is closed the auxiliary contacts disengage to include a resistance $r$ in circuit with the coil $62^a$. The circuit of winding $61^a$ of the main switch may be traced from line L to conductor 87 by conductor 88 through relay 62, by conductor 98 through said winding, by conductor 99 through auxiliary contacts 100 of said main switch, to conductor 91 and line L′, assuming said main switch to be open. When said main switch closes the auxiliary contacts 100 disengage to include a resistance $r'$ in circuit with the winding $62^a$.

In practice it is also desirable to provide for testing the voltage of the individual batteries and it is to facilitate such tests that the contact clips 51 are provided on the rack units. As above explained, each pair of adjacent clips have connections to the contacts of a common battery compartment and accordingly it is only necessary to bridge adjacent contacts through a voltmeter for the desired voltage test of the battery connected therebetween. And for convenience a voltmeter 101 may be mounted upon a paddle 102, as shown in Fig. 9 and provided with projecting terminal members 103 and 104 to engage said clips which are equidistantly spaced for this purpose.

What I claim as new and desire to secure by Letters Patents is:

1. Sectional charging apparatus for portable batteries which comprises separate and like rack units, each to accommodate a plurality of batteries and each having contacts to engage the terminals of the batteries carried thereby and supporting means upon which a plurality of said rack units may be supported in different relations with respect to one another for different group formations thereof.

2. Sectional charging apparatus for portable batteries which comprises separate and like rack units each to accommodate a plurality of batteries and each having contacts to engage the terminals of the batteries carried thereby and supporting means upon which a plurality of said rack units may be mounted in different relations including either an end to end or back to back relation thereof.

3. Sectional charging apparatus for portable batteries which comprises separate and like rack units each having a plurality of battery compartments, contacts for engagement with the terminals of the several batteries carried thereby for series connection thereof and a plurality of sets of line terminals and means for supporting a plurality of said rack units for different group formations thereof with each of said units disposed for an adjacent relationship of one set of its terminals with a set of terminals of another of said units.

4. Sectional charging apparatus for portable batteries comprising separate and like rack units each to accommodate a plurality of batteries and each having at opposite ends thereof a set of terminals and means upon which said rack units may be supported in either an end to end relation or in an overlapping relation to dispose one set of terminals of each of said units in an adjacent relation to a set of terminals of another of said units.

5. Sectional charging apparatus for batteries comprising separate and like rack units each to accommodate a plurality of batteries and each having at opposite ends thereof a set of terminals and means upon which a plurality of said rack units may be supported in either an end to end or back to back relation, said means insuring horizontal alignment of the units supported in such relation.

6. Sectional charging apparatus for portable batteries comprising separate and like rack units each to accommodate a plurality of batteries and each having external current carrying parts, means upon which a plurality of said rack units may be mounted in different relations with respect to one another including a relation in which certain of said rack units overlie the current carrying parts of other of said units, said means insuring spacing of said rack units in all relations thereof.

7. Sectional charging apparatus for batteries comprising a charging rheostat unit, separate and like rack units, each to accommodate a given percentage of the total number of batteries which may be connected to said rheostat and means for supporting said rack units and rheostat unit in a grouped relation.

8. Sectional charging apparatus for batteries comprising separate and like rack units, each to accommodate a plurality of batteries, a plurality of rheostat units adapted to serve for a plurality of said rack units and means for supporting said rack units and rheostat units with said rack units aligned with their respective rheostat units and with the latter aligned with one another.

9. Sectional charging apparatus for batteries comprising separate and like rack units, each to accommodate a plurality of batteries, a plurality of rheostat panels each adapted to serve for a plurality of said rack units, a common meter panel and means for supporting said rack units and panels with the latter arranged in vertical alignment and with said rack units stacked for horizontal alignment with their respective rheostat panels.

10. A sectional charging rack for batteries comprising rack units each to accommodate a plurality of batteries each having contacts to engage the terminals of the batteries carried thereby, and means for supporting a group of said units, said means comprising a plurality of upright supports and each of said units being mountable upon a pair of such supports.

11. A sectional charging rack for batteries comprising rack units, each to accommodate a plurality of batteries, and each having contacts to engage the terminals of the batteries carried thereby, parallel upright pipe supports and means for independently securing said rack units to a pair of said pipe supports.

12. A sectional charging rack for batteries comprising rack units, each to accommodate a plurality of batteries, and each having contacts to engage the terminals of the batteries carried thereby, parallel upright pipe supports, means for independently securing said rack units to a pair of said pipe supports and means affording adjustment of each rack unit longitudinally of its respective pipe supports.

13. A sectional charging rack for batteries comprising rack units, each to accommodate a plurality of batteries, and each having contacts to engage the terminals of the batteries carried thereby, parallel upright supports and means for securing each of said units to a pair of said supports and for securing a plurality of said units in an end to end relation to a common support.

14. A sectional charging rack for batteries comprising rack units, each to accommodate a plurality of batteries, and each having contacts to engage the terminals of the batteries carried thereby, parallel upright supports and means for securing each of said units to a pair of said supports and for securing a plurality of said units in back to back relation to common supports.

15. A sectional charging rack for batteries comprising rack units, each to accommodate a plurality of batteries, and each having contacts to engage the terminals of the batteries carried thereby, and supporting members for a plurality of said rack units, the latter having hooks to releasably secure the same individually to the former.

16. A sectional charging rack for batteries comprising rack units each to support a plurality of batteries and each provided with contacts to engage the terminals of the batteries carried thereby and supporting hooks, and parallel upright supports having parts to receive the hooks on said rack units.

17. A sectional charging rack for batteries comprising rack units each to support a plurality of batteries and each provided with contacts to engage the terminals of the batteries carried thereby and supporting hooks, parallel upright supports and brackets mounted upon said supports to be engaged by the hooks of said rack units, said brackets being adjustable longitudinally of said supports.

18. Sectional charging apparatus for batteries comprising a plurality of rack units, each to accommodate a plurality of batteries and a rheostat unit having a variable resistance to control the circuit of a given number of said rack units when connected in series, and having another resistance for said circuits to be adjusted in accordance with the number of rack units connected therein for the purpose set forth.

19. Sectional charging apparatus for batteries comprising separate and like rack units, each to accommodate a plurality of batteries and a rheostat unit adapted to be included in series with a given number of said rack units, said rheostat having a resistance to compensate for variations in the number of rack units connected thereto, said resistance having controlling means for adjusting the same in steps, each step being of a value to compensate for one of said rack units.

20. Sectional battery charging apparatus comprising separate and like rack units, each adapted to accommodate a given percentage of the total number of batteries chargeable on a single circuit and each having means to maintain a substantially constant resistance thereof regardless of the number of batteries contained therein, and a rheostat unit adapted for series connection with a given number of said rack units, said rheostat unit being provided with a variable resistance to regulate at will the circuit of the batteries connected thereto and with an additional resistance adjustable to compensate for variations in the number of rack units included in said circuit.

21. Sectional charging apparatus for batteries comprising rack units each adapted to accommodate a plurality of batteries, a plurality of rheostat panels, each adapted to be included in series with a plurality of said rack units and each provided with a switch controlling the continuity of the charging circuit of its respective rack units, and a meter panel having means to control the supply circuits of a plurality of said rheostat panels and a meter adapted to be included in any one of said charging circuits by said switch of the respective rheostat panel.

22. A battery charging rack unit comprising a frame divided into a plurality of battery compartments and a pair of yieldably mounted contacts arranged in each of said compartments for engagement with the terminals of the battery to be accommodated thereby, the contacts of each compartment being disposed along a line extending from front to back of such compartment.

23. A charging rack unit for batteries comprising a frame divided into a plurality of battery compartments, an insulating slab extending across said compartments, a pair of substantially mushroom shaped contacts for each of said compartments, each of said contacts having a stem projecting through said insulating slab and means mounted on the outer face of said slab to engage and support said contact stems for reciprocatory and rotary movements of said contacts.

24. A rack unit for battery charging apparatus comprising a frame divided into a plurality of compartments, each to accommodate a battery, a pair of contacts for each of said compartments, said contacts being interconnected to provide a series circuit extending from a contact at one end of said frame to a contact at the opposite end of said frame and an electrically isolated conducting bar mounted upon said frame and extending from end to end thereof.

25. A rack unit for charging apparatus comprising a frame divided into a plurality of compartments each to accommodate a battery and insulating top for each compartment of said frame, a pair of contacts for each of said compartments arranged therewithin and having parts projecting through the insulating top thereof yielding supporting means for each of said contacts mounted on the outer face of the insulating top of its respective compartment, a resistance unit and contacts also mounted on the outer face of the insulating top of each of said compartments, the latter contacts being engageable to connect each of said resistances between the inner contacts of one of said compartments subject to exclusion of the same from circuit upon insertion of a battery in the corresponding compartment.

26. A rack unit for battery charging apparatus comprising a frame divided into a plurality of compartments, each to receive a battery, a pair of contacts for each of said compartments, a plurality of resistance units each for connection between the contacts of one compartment, a resilient supporting member for each contact, auxiliary contacts to be engaged by certain of said supporting members to connect said resistances in circuit subject to exclusion from circuit upon insertion of a battery in its respective compartment, interconnections for said compartment contact providing a series circuit from one extreme end contact to another extreme end contact and an insulating top for each of said compartments affording support for all of said current carrying parts and affording a barrier between the battery and all current carrying parts other than said compartment contacts.

27. A rack unit for battery charging apparatus comprising a frame divided into a plurality of compartments, each to accommodate a battery, an insulating slab carried by said frame, contacts for said compartments mounted on said insulating slab and uniformly spaced contact clips mounted on said slab and connected with said compartment contacts whereby the connection of a voltmeter between adjacent contact clips enables a voltage reading for a corresponding battery compartment.

28. A rack unit for battery charging apparatus comprising a frame, partitions therefor dividing the same into battery compartments into which the batteries must be inserted with one terminal of each in advance of the remaining terminal thereof and a pair of contacts for each of said compartments arranged in a relation to engage the terminals of a battery so inserted.

29. A charging rack unit for portable batteries of a type having different dimensions transversely of and parallel to the line connecting its terminals, the latter dimension being greater than the former, said unit comprising a frame, partitions for said frame dividing the same into battery compartments of interior shape and dimensions requiring edgewise insertion of the batteries, each with a given edge thereof in advance and a pair of contacts for each of said compartments arranged therein to engage the battery terminals.

30. A charging rack unit for portable batteries comprising a metallic skeleton frame, partitions dividing said frame into a plurality of battery compartments, an insulating top and base for each of said compartments and a pair of contacts within each compartment having terminals extending through the insulating tops of their respective compartments.

In witness whereof, I have hereunto subscribed my name.

ALBERT J. HORTON.